United States Patent [19]

Konya

[11] Patent Number: 5,937,396
[45] Date of Patent: Aug. 10, 1999

[54] SYSTEM FOR ATM/ATM TRANSFERS

[76] Inventor: Arpad Konya, 116 E. Haverhill St., Lawrence, Mass. 01841

[21] Appl. No.: 08/759,185

[22] Filed: Dec. 4, 1996

[51] Int. Cl.[6] ............................. G06F 15/00; G06F 15/30
[52] U.S. Cl. .................................. 705/43; 705/39; 705/42
[58] Field of Search .................................. 705/8, 17, 21, 705/33, 39, 40, 42, 43

[56] References Cited

U.S. PATENT DOCUMENTS

| | | |
|---|---|---|
| 3,833,885 | 9/1974 | Gentile et al. . |
| 3,943,335 | 3/1976 | Kinker et al. . |
| 4,692,600 | 9/1987 | Takahashi . |
| 4,761,542 | 8/1988 | Kubo et al. . |
| 4,803,347 | 2/1989 | Sugahorn et al. . |
| 4,922,419 | 5/1990 | Ohashi et al. . |
| 5,064,999 | 11/1991 | Okamoto et al. . |
| 5,175,416 | 12/1992 | Mansvelt et al. . |
| 5,220,157 | 6/1993 | Martin et al. . |
| 5,326,960 | 7/1994 | Tannenbaum . |
| 5,350,906 | 9/1994 | Brody et al. . |
| 5,382,777 | 1/1995 | Yuhara et al. . |
| 5,420,405 | 5/1995 | Chasek . |
| 5,477,038 | 12/1995 | Levine et al. . |
| 5,546,523 | 8/1996 | Gatto . |

FOREIGN PATENT DOCUMENTS

| | | |
|---|---|---|
| 58-129578 | 8/1983 | Japan . |
| 58-169287 | 10/1983 | Japan . |
| 60-69774 | 4/1985 | Japan . |
| 60-195671 | 10/1985 | Japan . |

*Primary Examiner*—Allen R. MacDonald
*Assistant Examiner*—James W. Myhre
*Attorney, Agent, or Firm*—Richard C. Litman

[57] ABSTRACT

A system is disclosed for transferring currency electronically between accounts. The system allows currency to be immediately transferred from a first account to a ATM. The first account can be accessed in a number of ways, including remotely from a general purpose computer or from an ATM using a transaction card. The ATM provides the individual with a plurality of transaction choices such as the transfer of an amount of currency to a second account. The ATM transmits information to a main computer regarding the second account and the amount of currency to be transferred. The main computer includes a database containing entry codes and routing codes for a plurality of banks belonging to the present electronic transfer network. Using this database, the main computer validates information such as the entry code for the banks and the availability of the second account prior to allowing the transaction to proceed. A transaction card associated with the second account is used to compare the recipient account to the account number provided by the sender. The transferred currency can then be retrieved using a second ATM. The transaction card is used solely to identify the recipient and currency is not actually transferred to the second account.

17 Claims, 8 Drawing Sheets

SYSTEM FOR ATM/ATM TRANSFERS

BACKGROUND OF THE INVENTION

1. Field of the Invention

The present invention relates to a system for conducting financial transactions and more particularly to a system for transferring currency for disbursement at a remotely located automated teller machine (ATM).

2. Description of the Prior Art

Automated teller machines are well known for providing an individual with access to accounts which may be held at various financial institutions. In recent years, the availability of ATM's has increased such that it has now become commonplace for an individual to use such machines for the withdrawal of funds from various accounts regardless of whether or not the bank is open or closed. In fact, ATM's are often found in malls, supermarkets, and other areas where banks are not even present. Using an ATM, an individual can even obtain currency from a credit card.

Thus, it can be appreciated that a variety of cards exist for providing an individual with access to ATM's as well as various means for transferring funds electronically. Typical cards include a magnetic strip on which information for a particular account is encoded. The magnetic strip can then be read by specialized terminals. Credit cards, for example, are typically read by terminals at a merchant's site, commonly referred to as a Point of Sale (POS) terminal. The account number is then transmitted over a network along with the amount of the transaction in order to receive verification. Prior to authorizing the transaction, a remote central computer queries a database associated therewith to determine if the transaction amount is within the limit of the individual's credit.

Debit cards have also gained popularity and accessibility in recent years. Contrary to a credit card which is used to extend credit, a debit card is used to withdraw currency from an existing account and immediately credit the merchant. The amount of the transaction is deducted from the individual's account, which must periodically be replenished. Thus, debit cards require that a customer's account actually contain enough currency to cover the transaction in order to obtain approval.

Banking cards have also gained popularity over recent years. While similar to debit cards in that currency must be present in an existing account, banking cards are typically designed to access an individual's banking account remotely and without the aid of a teller. Banking cards are used in conjunction with ATM's and thus offer convenient access to one's checking and/or savings account. Due to the similarities in function between a debit card and a banking card, as well as the improved intercommunication between ATM networks, many banking cards are capable of functioning as debit cards. Thus, banking cards have gained overwhelming popularity among those who wish to travel or desire convenient access to currency.

There exists several ATM systems in the U.S.A. and around the world. These systems are interlinked such that an individual may travel to virtually any location and retrieve money from their account using a local ATM. The account is accessed by inserting a card in an ATM machine and supplying a preassigned Personal Identification Number (PIN). Upon verification of the PIN, the individual is provided access to their account and may withdraw funds therefrom. The ATM also allows individuals to perform various other transactions which normally requires the assistance of a teller. Such transactions include, for example, deposits, transfer of funds between accounts in the same bank, account balance, etc. The use of the ATM is facilitated by a keypad and various function keys. The keypad allows the user to enter specific numerical information, while the function keys allow quick responses to various questions or prompts. The individual is also provided with such conveniences as the selection of a preferred language for conducting the current session at the ATM.

Various methods currently exist for transferring currency from one location to another. However, these methods have not changed much since their original conception many years ago. One such method is a wire transfer. For example, an individual wishing to transfer currency to another at a different location would go to a first wire transfer office and have the currency wired to a second wire transfer office in the city where the recipient is located. This method first assumes that the second wire transfer office is conveniently located from the recipient. Furthermore, it assumes that the second wire transfer office is open at the time when the recipient needs the currency. While both assumptions have merit, one must keep in mind that most situations where currency must be transferred from one location to another are emergency situations. Thus, convenient hours may not exist, and the second wire transfer office may not be readily accessible to the recipient. When differences in time zones are accounted for, the present system of wire transfer becomes cumbersome at best.

While various methods exist for performing electronic financial transactions, none are capable of combining the functionality of wire transfers with the convenience of card transactions. The prior art discloses numerous systems and methods for conveniently performing electronic fund transfers. For example, U.S. Pat. No. 3,833,885 issued on Sep. 3, 1974 to Gentile et al. discloses an automatic banking system which includes a central processing unit coupled to one or more remote automatic dispensing terminal banking machines. The system provides fully automatic stations for completing banking functions in response to a coded credit card presented to a dispensing station. The system performs several standard checks of the credit card code prior to offering a transaction selection. The remote terminal assembles an authorization request and transmits it to a central computer. The central computer interrogates account files and transmits an authorization reply message to the remote terminal with instructions on how to complete the transaction. Upon completion of the transaction, the remote terminal transmits a completion message to the central computer.

U.S. Pat. No. 3,943,335 issued on Mar. 9, 1976 to Kinker et al. discloses an automatic banking system equipment which presents a remote customer station unit which enables the customer to carry out a number of banking services such as: deposits, bill payments, funds transfer between accounts, or cash withdrawal. The equipment includes programmable display means for instructing the customer.

U.S. Pat. No. 4,692,600 issued on Sep. 8, 1987 to Takahashi discloses an automatic transaction system including a card reader for reading data from a card containing user identification information encoded thereon. Upon insertion of the card, an operating unit is provided with transaction selection keys and an amount key, and a display unit.

U.S. Pat. No. 4,761,542 issued on Aug. 2, 1988 to Kubo et al. discloses an automatic money receiving and paying method and apparatus. Various types of guidance information are stored in advance in an automatic money receiving and paying apparatus. Necessary information is then selected from the various types of guidance information on the basis of user characteristics so that proper guidance may be provided.

U.S. Pat. No. 4,803,347 issued on Feb. 7, 1989 to Sugahara et al. discloses an automatic transaction machine which normally operates in an on-line mode with a central station. If during the course of a transaction a communications interruption occurs between the machine and a central station, the transaction can be completed off-line with storage at the machine of the off-line transaction data for later transmission to the central station for account updating.

U.S. Pat. No. 4,922,419 issued on May 1, 1990 to Ohashi et al. discloses a system for performing a desired transaction when the customer follows a specified procedure. The system includes an electronic visual display unit for simultaneously displaying a message and a graphic illustration, and a plurality of functionally operative and physically manipulative function units arranged around the display unit.

U.S. Pat. No. 5,064,999 issued on Nov. 12, 1991 to Okamoto et al. discloses an advance transaction processing method for conducting transactions on an automatic teller machine. The method involves registering transaction assigning data for assigning transaction operations to be conducted by the user, a transaction restriction condition, and a card identifying data on the card carried by the user. A transaction-operational procedure is stored in a storage device of the central procession unit by using the transaction assigning data as a key for search. When the card is inserted into the automatic teller machine, confirmation is provided as to whether the transaction restriction condition is satisfied. The transaction operational procedure is then read and the automatic teller machine is allowed to process the transaction.

U.S. Pat. No. 5,175,416 issued on Dec. 29, 1992 to Mansvelt et al. discloses a method of transferring funds. A first "smart card" is linked to a first financial institution. The first smart card then debits an account held at the first financial institution and records a corresponding credit value in the first smart card. The first smart card is linked to a second, similar device so that the credit value in the first device is reduced and a corresponding credit value is recorded in the second device. The second device is then linked to a second financial institution and the credit value in the second device is reduced while a corresponding credit value is recorded in an account held at the second financial institution. The first and second devices each store at least a portion of a program which is run in a synchronized interactive manner between the first devices.

U.S. Pat. No. 5,220,157 issued on Jun. 15, 1993 to Martin et al. discloses a time delayed cash dispenser which is interconnected with a node processor interfaced to an EFT system. The node processor emulates an ATM in order to access and perform transactions through the EFT system. A printer may be activated in order to issue scrip representative of authorized cash disbursements. The node processor also generates electronic commands to activate the cash dispenser upon manual entry of a transaction code to disburse cash redemption for the scrip.

U.S. Pat. No. 5,326,960 issued on Jul. 5, 1994 to Tannenbaum discloses a currency transfer system and method which utilizes the existing ATM network. The system is capable of temporarily assigning a PIN number and temporarily establishing a credit limit within an existing account. The system allows a customer to withdraw an amount equal to or less than the temporary credit limit by using the temporary PIN at an ATM machine. The depositing customer can establish a temporary credit limit by transferring funds from an existing account or the depositing customer can purchase temporary ATM cards which contain preprogrammed credit limits. The credit limits are then read into the system under an assigned temporary PIN number.

U.S. Pat. No. 5,350,906 issued on Sep. 27, 1994 to Brody et al. discloses a currency transfer system and method which utilizes the existing ATM network. The system is capable of temporarily assigning a PIN number and temporarily establishing a credit limit within an existing account. The system allows a customer to withdraw an amount equal to or less than the temporary credit limit by using the temporary PIN at an ATM machine. The depositing customer purchases temporary ATM cards which contain preprogrammed credit limits. The credit limits are then read into the system under an assigned temporary PIN number.

U.S. Pat. No. 5,382,777 issued on Jan. 17, 1995 to Yuhara et al. discloses an automated teller machine provided with a plurality of input means and a corresponding method for conducting transactions using the machine. A touch sensor is provided in the machine for producing a signal when a user touches a previously registered area with a finger. A character recognition sensor is also provided for recognizing characters drawn on another previously registered area. The sensor to be operated is selected in accordance to input data, the kind of transaction, and/or user preference.

U.S. Pat. No. 5,420,405 issued on May 30, 1995 to Chasek discloses a secure, automated transaction system that supports an electronic currency operating in mixed debit and credit modes. The system creates electronic money for personal transactions for integrating the functions of cash, checks, and credit cards with constant surveillance against fraud. The money can also serve as an international medium of exchange, and supports automated sales tax collection and payment. The system includes personal terminals, vendor terminals, an electronic banking subsystem, and home-base terminals.

U.S. Pat. No. 5,477,038 issued on Dec. 19, 1995 to Levine et al. discloses a method and apparatus for distributing currency. The method provides a process which allows electronic access to pre-paid funds for cash or payment for goods and services. The customer selects monetary value to be contained on an issued card which has a magnetic strip on the surface thereof with an encoded card number including a bank identification number and an account number. The central card processor establishes a zero balance database including card numbers. The database includes blank fields for customer data and the value of the account. Upon purchase of a card, the sales agent transmits customer information to the central database so that the account may be activated.

U.S. Pat. No. 5,546,523 issued on Aug. 13, 1996 to Gatto discloses an electronic fund transfer system capable of displaying a menu which has one or more user-defined transactions associated with an identification card. The system allows the user to select desired transactions via a single selection or with limited inputs. The transactions may be defined by the user during a setup operation and/or may be stored based on transactions performed by the user. Additionally, the transactions may be stored on the identification card, in the local memory of a transaction terminal, and/or in the system memory of the electronics funds transfer system. The system allows a user to access a number of financial accounts with different institutions using a single identification card.

Japanese Patent #58-129,578 issued on August 1983 discloses an automatic transaction device which discriminates bank notes and reads discriminating data out to a transaction controlling part through a register. A transfer designating button is applied to a control part and a charge operating part so that a charge of transfer data which is stored in the register may be calculated.

Japanese Patent #58-169,287 issued on October 1983 discloses a transfer processing system designed to improve services by performing transfers automatically and in parallel to either or both of withdrawal from or depositing on a deposit account.

Japanese Patent #60-69,774 issued on April 1985 discloses a money transfer processing system for secure transactions through an automatic transaction device. The system enables cash transfer to another banking agency by reducing transfer destination information that a person must input.

Japanese Patent #60-195,671 issued on October 1985 discloses an automatic money transferring device for making transfer operations to any desired destination at all branches of member banks of a nationwide bank association. The device provides simple operations which the customer can perform complete the transfer operations. A file device is also provided to store the names of all branches of the member banks.

None of the above inventions and patents, taken either singly or in combination, is seen to describe the instant invention as claimed.

SUMMARY OF THE INVENTION

Accordingly, it is a principal object of the invention to provide a system for transferring currency electronically between accounts.

It is another object of the invention to provide a system for transferring currency using a general purpose computer.

It is a further object of the invention to provide a system for transferring currency from one ATM to another.

Still another object of the invention is to provide a method for transferring currency electronically.

It is an object of the invention to provide improved elements and arrangements thereof in an apparatus for the purposes described which is inexpensive, dependable and fully effective in accomplishing its intended purposes.

In accordance with the objects of the invention, a system is provided for transferring currency electronically to an ATM. The system allows currency to be immediately transferred from a first account. The first account is accessed and an amount of currency is selected for transfer. The first account can be accessed in a number of ways, including remotely from a general purpose computer or from an ATM using a transaction card. The term transaction card, as used hereon, refers to any of a plurality of types of cards having a magnetic strip containing information stored thereon regarding a particular account. Examples of such cards include credit cards, debit cards, and banking cards. In preferred embodiments of the invention, an ATM is used to access the first account in order to provide convenience and availability.

The ATM is typically a terminal which is remotely linked to a first computer system. The ATM may also be linked directly to a main computer via appropriate communication devices such as a modem functionally coupled to a telephone line. Thus, the ATM is capable of transmitting information regarding any transactions to the main computer. The ATM executes a program which provides the individual with a plurality of transaction choices such as the transfer of an amount of currency for dispensing at an ATM. The individual is also provided with conventional ATM functions for accessing their various accounts which are associated with the current transaction card. If the individual chooses to transfer currency to an ATM, the terminal transmits information to the main computer regarding a second account and the amount of currency to be transferred.

The main computer includes a database containing entry codes for a plurality of banks belonging to various ATM networks. The entry codes are assigned by the main computer in order track banks and financial institutions authorized to use the system. Using this database, the main computer validates the second account and verifies that the first account contains sufficient currency to cover the current transaction. The procedure is similar to current procedures of verifying the amount of currency available in an account when a withdrawal is made. The main computer stores the number of the second account and uses it only to identify the recipient. If sufficient currency is available and the second account is validated, then the main computer responsively transmits a signal to debit the first account by the amount of currency requested for transfer. Depending on specific applications of the system, limits may be imposed on the amount of currency which may be transferred and received.

A second ATM is used to retrieve the transferred currency. Once the currency is dispensed to the recipient at the second ATM, the transaction is completed and commissions or transaction fees are allocated. If the second ATM is located in a country which uses currency different from that of the country where the first account is located, then the active exchange rate being used by the bank or ATM network is applied. The first and second accounts may be contained in different banks or financial institutions. In essence the first bank need not necessarily be a branch of the second bank. They may be entirely different with no affiliation whatsoever. Furthermore, the currency is never actually transferred to the second account. The second account is used solely for comparison with the account provided by the sender in order to identify the recipient.

In accordance with another object of the invention, a method is provided for transferring currency between a first account and an ATM. The first account is accessed and a predetermined amount of currency is selected for transfer. The number of a second account to which the currency will be transferred is next requested. The information regarding the currency amount and the number of the second account is subsequently transferred to a main computer for validation and approval. Once the transaction has been validated, the currency may be retrieved from any ATM.

In order to access the first account, an individual may use a general purpose computer including a modem capable of accessing a telephone line. The general purpose computer is used to contact the main computer of the bank containing the first account. In preferred embodiments, however, the first account is accessed through a first ATM using a transaction card. The transaction card is inserted into the card reader of the first ATM and the PIN for the transaction card is entered using a keypad associated with the ATM. The individual navigates through a series of options until the option to transfer currency to an ATM, or second account, becomes available.

Retrieving the currency from the second ATM is accomplished in a similar manner. A transaction card is inserted into the second ATM. For security purposes, a PIN may be requested. Once the PIN has been validated with reference to the second account, the recipient may choose the option to dispense the currency.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
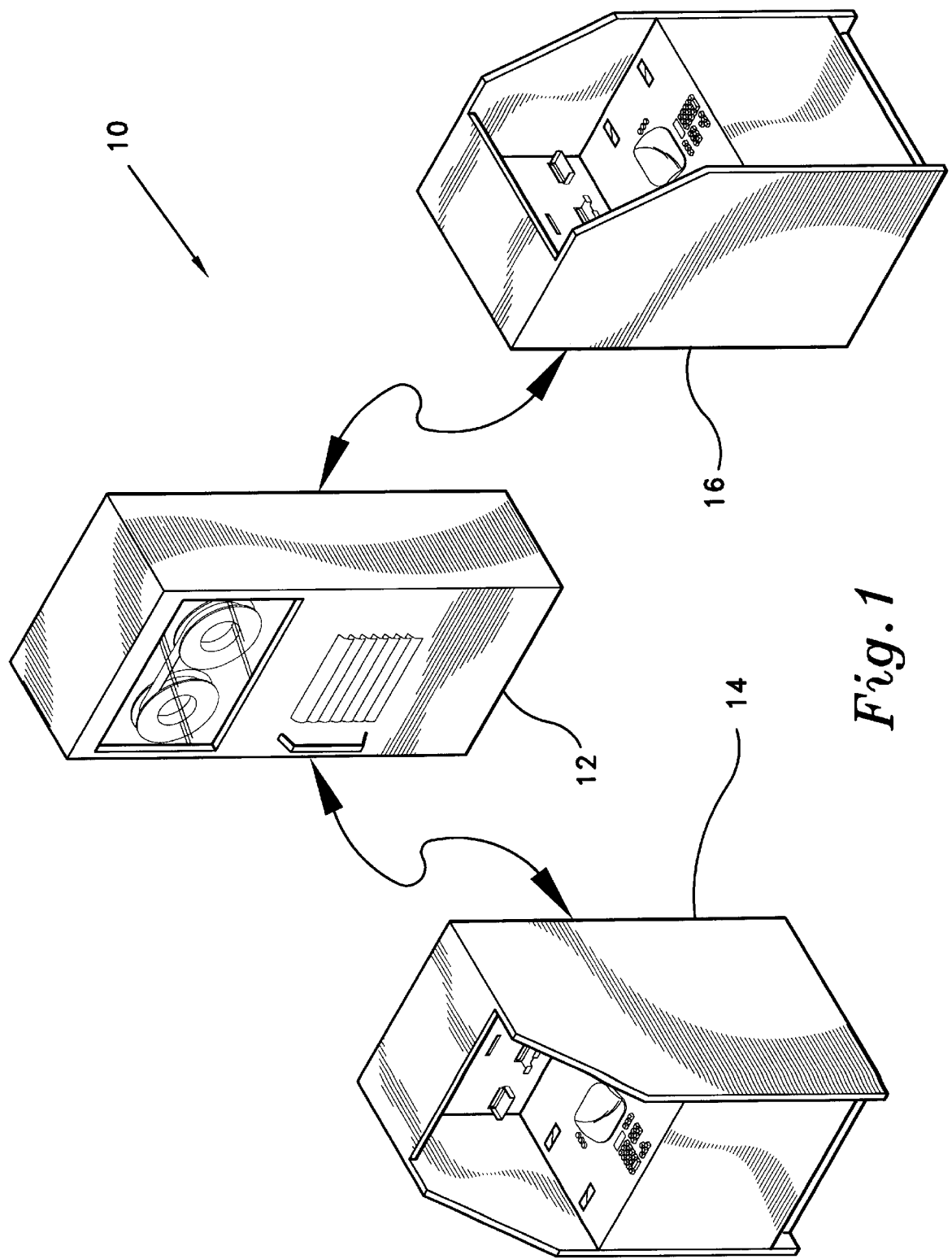
FIG. 1 is a perspective diagram of a currency exchange system in accordance with the present invention.

With reference to the drawings and initially to FIG. 1, a system is shown for transferring funds from a first account to an ATM, and generally indicated by the numeral 10. The system 10 allows currency to be immediately transferred from the first account so that the currency may be readily accessed. The system 10 includes a main computer 12, a first ATM 14, and a second ATM 16. The main computer 12 includes a database which assigns and stores an entry code for each bank authorized to use the system 10. For illustrative purposes, the first ATM 14 will be used in connection with the first account, while the second ATM 16 will be used in connection with the second, or recipient, account. The first and second accounts are maintained at a first and second bank respectively. The first and second banks may be various branches of the same financial institution or they may be individual branches of different financial institutions. The first bank includes a first computer system associated therewith, while the second bank includes a second computer system associated therewith. The first and second computer systems each include conventional hardware such as memory, data storage and retrieval devices, and communication devices such as a modem or the like. The first and second computer systems each execute an independent program in memory for creating a database. Each database contains information pertaining to the respective bank and the various accounts contained therein. The communication devices allow the first and second computer systems to communicate with other banks and with remote terminals such as the first and second ATM's 14, 16.

It should be appreciated that various other methods exist for linking the first and second ATM's 14, 16. For example, current ATM systems are interlinked through various ATM networks. Each ATM network includes its own computer system which may be subsequently interlinked with the computer system of a specific bank. In such instances, it is necessary for the first and second ATM's 14, 16 to establish interactive connections with the computer systems of their respective ATM networks prior to accessing the computer systems of the first and second bank. There are also instances where an ATM is maintained at a particular bank and capable of accessing the bank's computer system directly. Thus, as described herein connections between the first and second computer systems are understood to incorporate any intermediate connections to secondary ATM networks which are necessary to facilitate the transaction.

Figure 2:
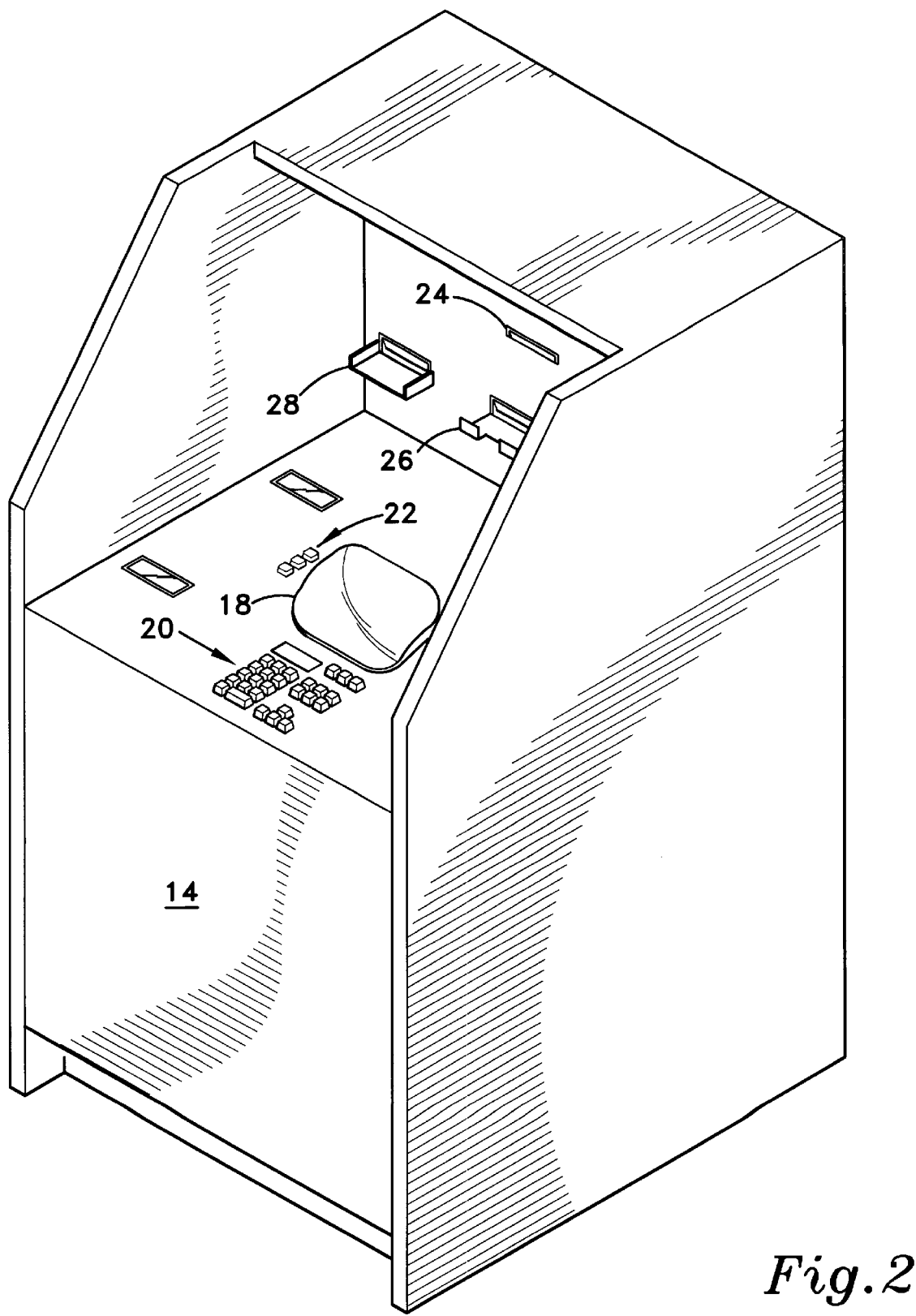
FIG. 2 is a perspective view of an ATM suited for use with the present system.

Turning now to FIG. 2, the first ATM 14 is shown in an enlarged manner so as to illustrate certain details associated therewith. For descriptive purposes, only the details of the first ATM 14 will be discussed. However, it should be noted that the first ATM 14 may be identical to the second ATM 16. Thus, all details of the first ATM 14 are equally applicable to the second ATM 16. It should also be appreciated that typical ATM's are quite complex in nature and the descriptions provided herein are only sufficient to provide an understanding of the novel features of the system 10.

The first ATM 14 includes a display 18 and a keypad 20 for performing various transactions on an account. The display 18 provides a plurality of transaction choices from which an individual may select using the keypad 20. The display 18 is also capable of providing instructional information as to the operation thereof. A plurality of function keys 22 may also be provided in order to reduce the number of transaction choices which must be made in order to complete certain common transactions. For example, many ATM's utilize function keys 22 to provide customers with a direct option to withdraw $100 from their checking account. If an alternative sum of currency were desired, an individual would need to select multiple options before being allowed to enter the amount which they need to withdraw.

An ATM is essentially a terminal which is linked to a complex communication system. This communication system allows the first and second ATM's 14, 16 to communicate interactively with the main computer 12. The first ATM 14 is also capable of remotely accessing the account database of various banks belonging to the system. Furthermore, the transaction choices provided by any individual ATM is directly dependent on the program currently being executed.

Figure 3:
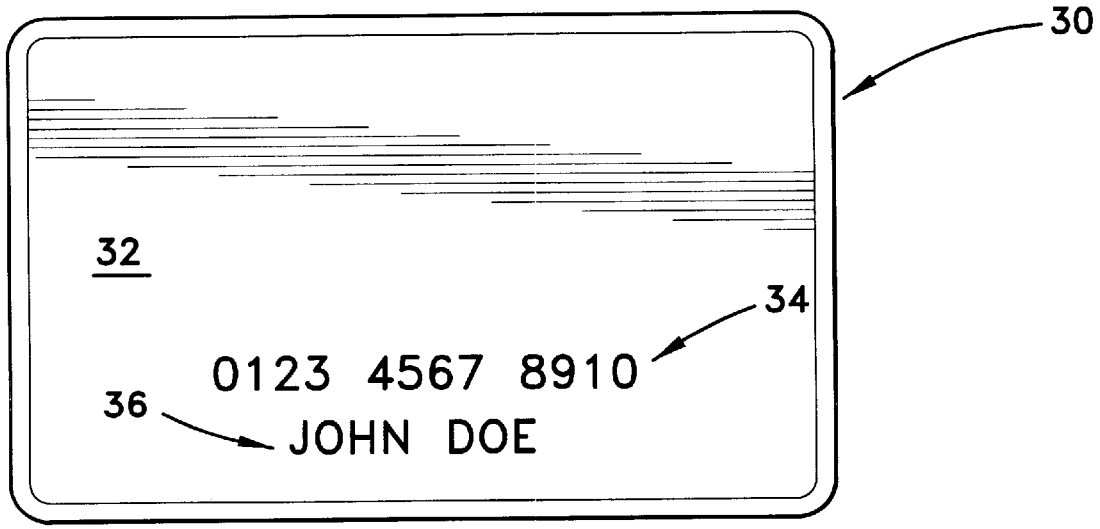
FIG. 3 is a top plan view of a transaction card for use with an ATM.
Figure 4:
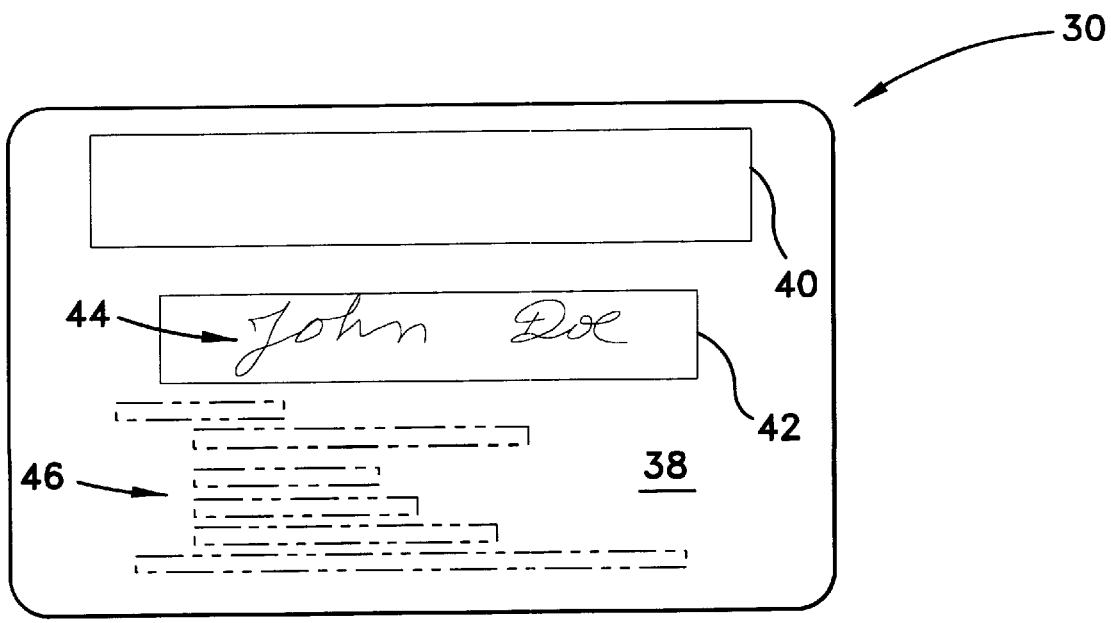
FIG. 4 is a bottom plan view of the transaction card.

The first ATM 14 also includes a currency dispenser 26 and receipt dispenser 28. The receipt dispenser 28 functions in conjunction with a printing device disposed within the first ATM 14. The printing device is used to prepare a transaction report which an individual can keep for their personal record. The transaction choices available from the first ATM 14 are accessed using a transaction card 30 such as the one illustrated in FIGS. 3 and 4. A transaction card 30 is typically constructed of plastic and sized approximately 4" by 2". The transaction card 30 includes a front surface 32 and a rear surface 38. Along the front surface 32 there is often displayed an account number 34 identifying the account to which the transaction card 30 is associated. The name 36 of the individual to whom the account belongs may also be provided on the front surface 32. Depending on the particular bank issuing the transaction card 30, various other information such as logos may be provided on the front surface 32 in order to identify the bank.

The rear surface 38 of the transaction card 30 contains a magnetic strip 40 on which information pertaining to the account is stored. This information often includes the account number and routing code of the bank issuing the transaction card 30. The routing code is a standard code which is used to identify particular bank and a specific branch thereof. A signature block 42 is also provided on the rear surface 38 so that the cardholders may provide a signature 44 suited for use as a reference in certain situations where authentication is required. The rear surface 38 may further include various information, illustrated by the numeral 46, pertaining to the operation of the transaction card 30, or instruction for actions to be taken if the transaction card 30 is found.

Turning once again to FIG. 2, the first ATM 14 is seen to include a card reader 24. The card reader 24 is capable of reading the information stored on the magnetic strip 40 of the transaction card 30. Accordingly, care must be taken in inserting the transaction card 30 since the magnetic reader 24 will often expect the magnetic strip 40 to be disposed in a predetermined orientation. Upon insertion of the transaction card 30 into the magnetic reader 24, the first ATM 14 verifies an individual's access to the account encoded thereon. This is accomplished by entering a preassigned PIN by means of the keypad 20. The various transaction choices provided by the first ATM 14 allow the individual to elect to transfer currency to a second account. In order to accomplish this, the number of the second account must be provided as well as a currency amount. After this information is entered, a recipient may retrieve the currency from a second ATM 16 using a second transaction card 30 associated with the second account. Once the currency has been retrieved, the system 10 performs all of the functions necessary to credit the ATM system with the value of the currency dispensed. Thus, the currency is not actually transferred to the second account. This credit is debited from the first account. The system also allocates commissions and transaction fees associated with the transfer. It should be appreciated that such a transaction card 30 will allow an individual to perform routine banking functions in addition to electronic currency transfers. Furthermore, the system 10 will also account for standard exchange rates when currency is transferred to different countries.

Figure 5:
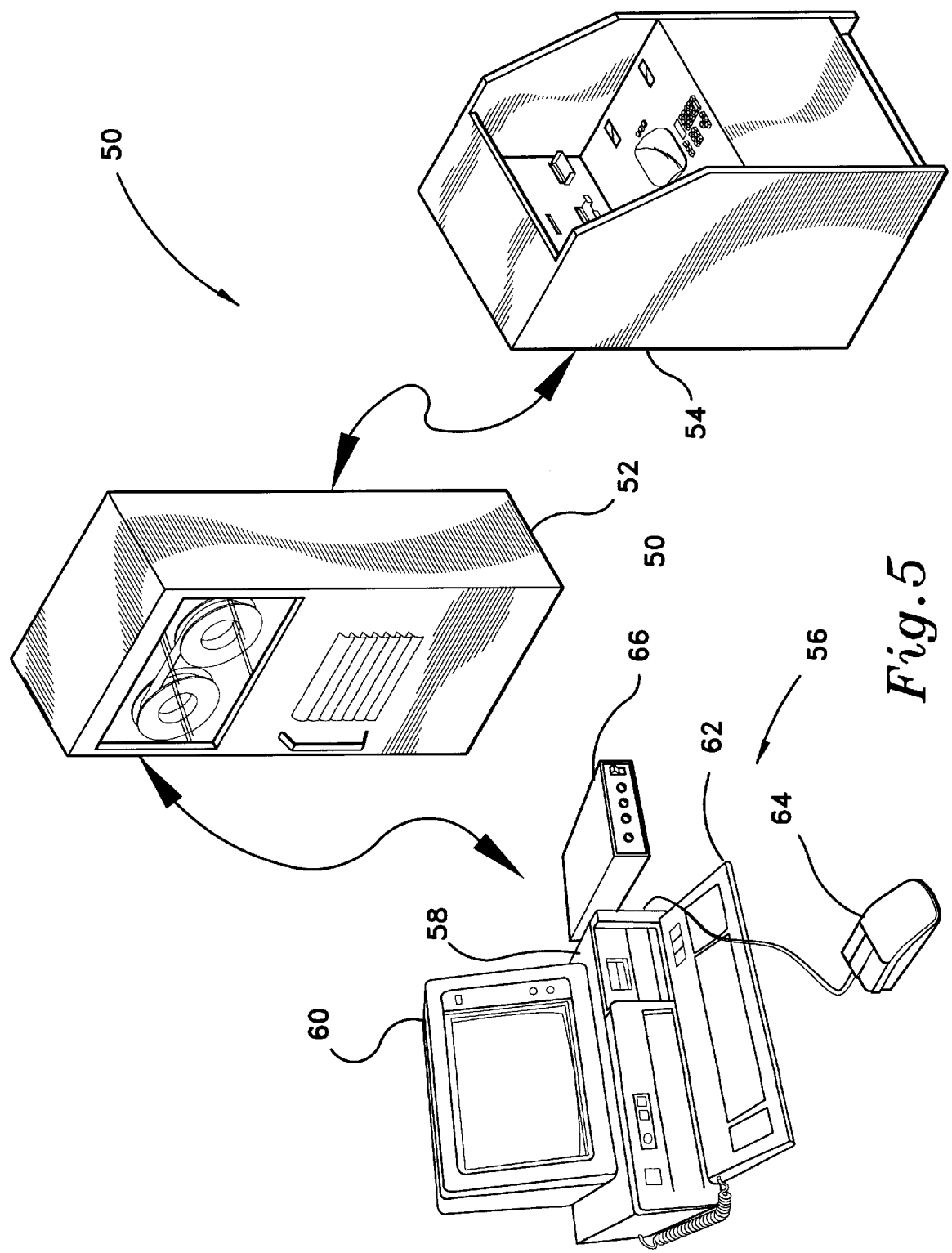
FIG. 5 is a perspective diagram of an alternative embodiment for the currency exchange system.

FIG. 5 illustrates an alternative embodiment of the present invention for transferring funds from a first account to an ATM. The system 50 includes a main computer 52, an ATM 54, and a general purpose computer such as a PC 56. The main computer 52 includes a database which assigns and stores an entry code for each bank authorized to use the system 50. The PC 56 includes various support hardware and peripherals such as a CPU 58, monitor 60, keyboard 62, a mouse 64, and a modem 66. The modem 66 is capable of being coupled to a phone line in order to remotely access other computers and systems.

The first and second accounts are respectively maintained at a first and second bank which may be individual branches of different financial institutions. The first bank includes a first computer system associated therewith, while the second bank includes a second computer system associate therewith. The first and second computer systems each execute an independent program in memory for creating a database. Each database contains information pertaining to the respective bank and the various accounts contained therein. Communication devices allow the first and second computer systems to communicate with other banks and with remote peripherals such as an ATM 54 or a PC 56 via a modem 66. The PC 56 is used to remotely access the first account via the modem 66. Once accessed, a variety of transaction choices are provided to successfully complete the transaction. In order to retrieve the transferred currency however, the ATM 54 must be used.

Figure 6A:
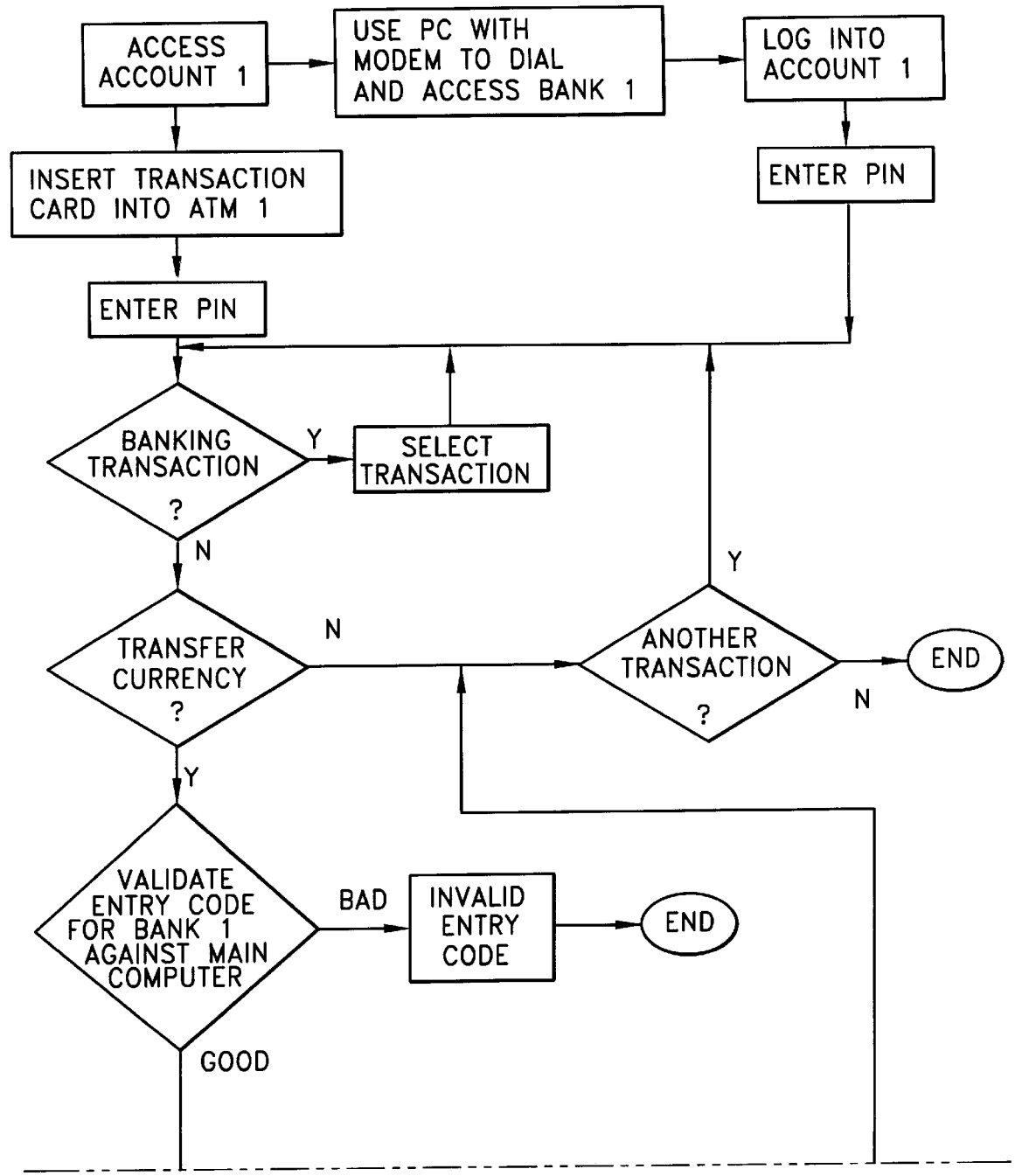
FIG. 6A is a partial flowchart illustrating the procedure to transfer currency.
Figure 6B:
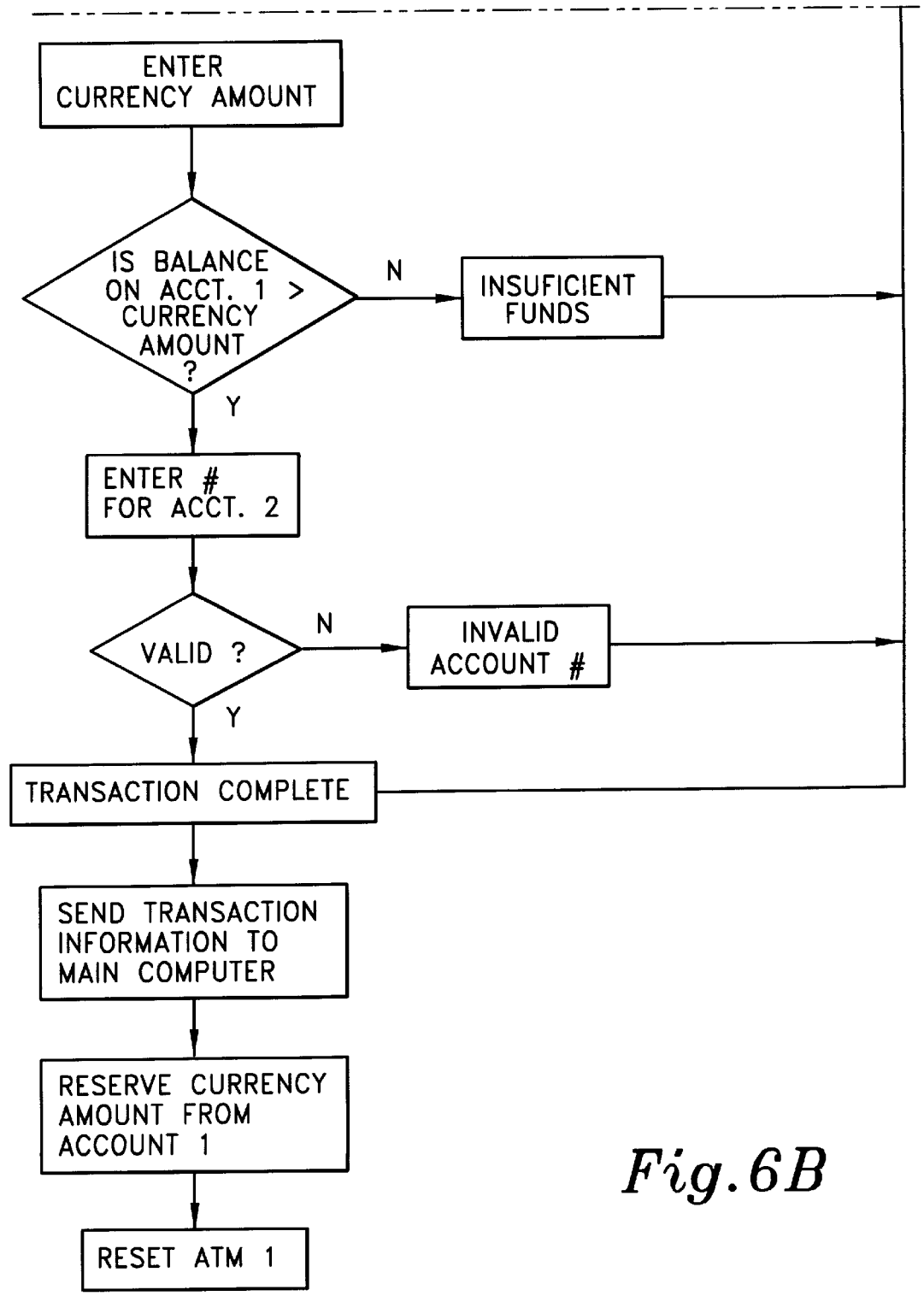
FIG. 6B is a partial flowchart illustrating the procedure to transfer currency.

FIGS. 6A and 6B outline the procedure necessary for transferring currency from the first account to the ATM. The first step is to access the first account. This may be accomplished in various ways, although only two are illustrated. One way of accessing the first account is through a first ATM. In doing so, a first transaction card is inserted into the card reader of the ATM in order to begin the session. The individual must next verify their authority to access the account by providing the appropriate PIN associated with the first account. Alternatively, the first account may be accessed using a PC equipped with a modem. The PC controls the modem and instructs it to dial a telephone number which the first bank's computer system will answer. Once the appropriate protocols are negotiated between the PC and the first computer system, the number for the first account as well as the PIN are entered via the keyboard and access to the account will be granted.

The individual may then elect to perform routine banking functions or transfer currency to a second account. If the individual does not wish to perform the transfer, they are prompted to perform other transactions. If no transactions are desired, the session is terminated. On the other hand, if the transfer of currency is desired, the first computer system transmits the entry code for the first bank to the main computer for validation. The main computer queries its database in order to determine if the entry code transmitted is valid. If it is valid, the main computer transmits a signal back to the first computer system to allow the transaction to proceed. Otherwise, the transaction will be cancelled.

The amount of currency to be transferred must next be provided to the first computer system. This is accomplished by entering a numeric value through the use of the numeric pad. The bank or ATM network may place restrictions on the amount of currency which may be transferred during a single transaction. Once the value has been entered, the individual may be prompted to verify the amount. Subsequent to verification, the first computer system examines its database in order to determine if the amount of currency selected for transfer exceeds the current balance of the first account. If the current balance is greater than the amount selected for transfer, the transaction is allowed to proceed. Otherwise, the individual is informed that insufficient funds are available and prompted to make another transaction.

Assuming the first computer system allows the transaction to proceed, the number of the second account must be provided to the first computer system using the numeric pad disposed on the first ATM. The second account number, which correspond to the recipient's account, must be validated to ensure its existence. The account may be validated in several ways. For example, the first computer system may query its database if the second account is held at another branch of the same financial institution. If the second account is held at a bank belonging to a different financial institution, then the main computer must be used to determine if the second account exists. If the second account does not exist in any of the databases, then the individual is informed that the account is invalid and prompted to make another transaction. Once the existence of the second account is verified, the interactive part of the transaction is completed. The individual is prompted to make another transaction. If no transactions are desired, then the session may be ended and the individual would retrieve the first transaction card from the card reader.

At this point, however, the actual transaction has not been completed by the ATM and the first computer system. Information regarding the transaction is transmitted to the main computer. This information may vary, but should contain enough data to uniquely identify a particular transfer. For example, information such as the number of the first account, the amount of currency transferred, and the routing code of the first bank should all be transmitted. The routing code identifies the financial institution to which the bank belongs as well as the specific branch. The account number identifies the specific account at the bank from which the currency must be debited. After this information has been transmitted to the main computer, the amount of currency requested for transfer is reserved from the first account. At this point, the transaction is completed and the ATM is reset so that another transaction card may be inserted to begin a new session.

Figure 7A:
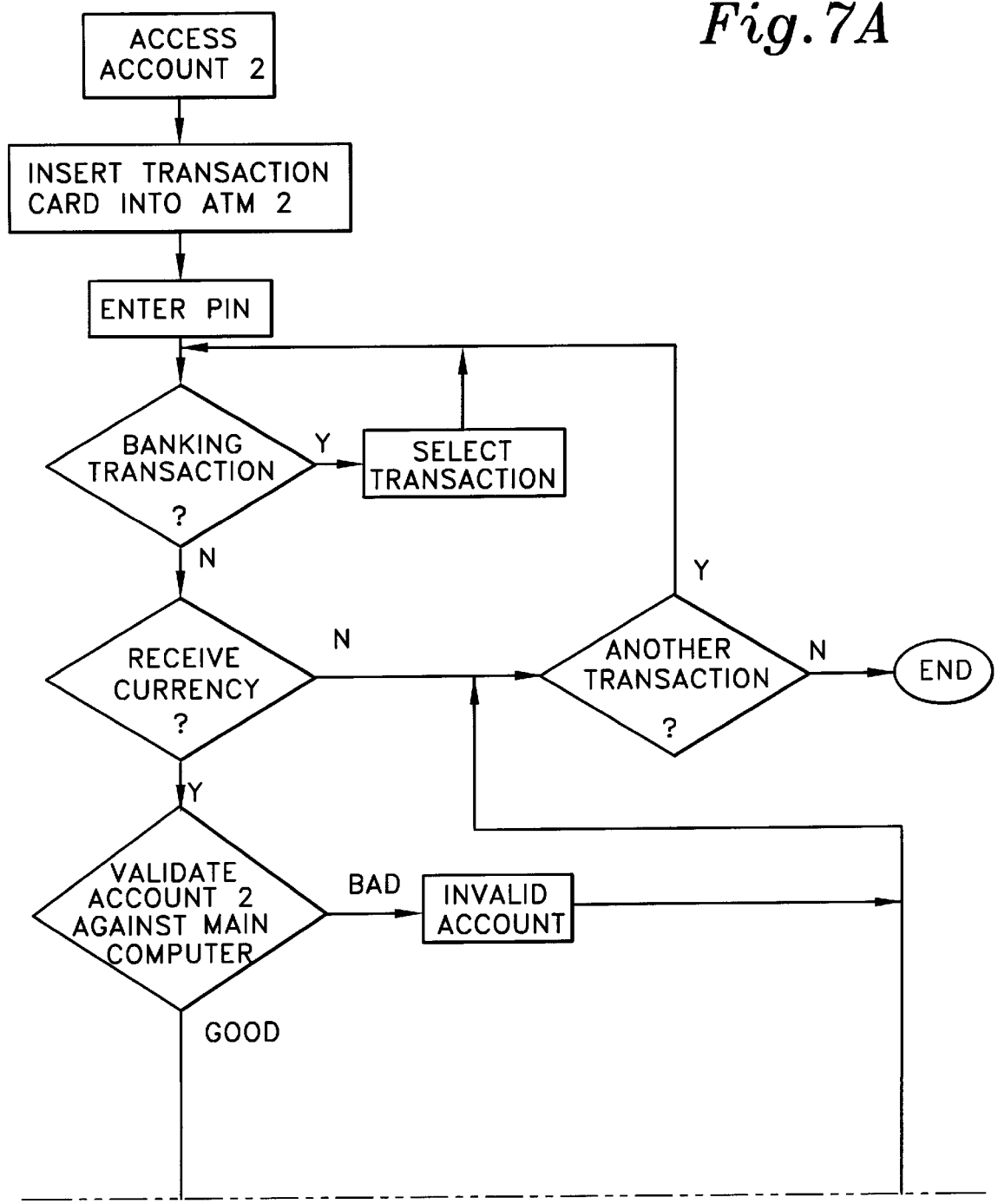
FIG. 7A is a partial flowchart illustrating the procedure to retrieve currency.
Figure 7B:
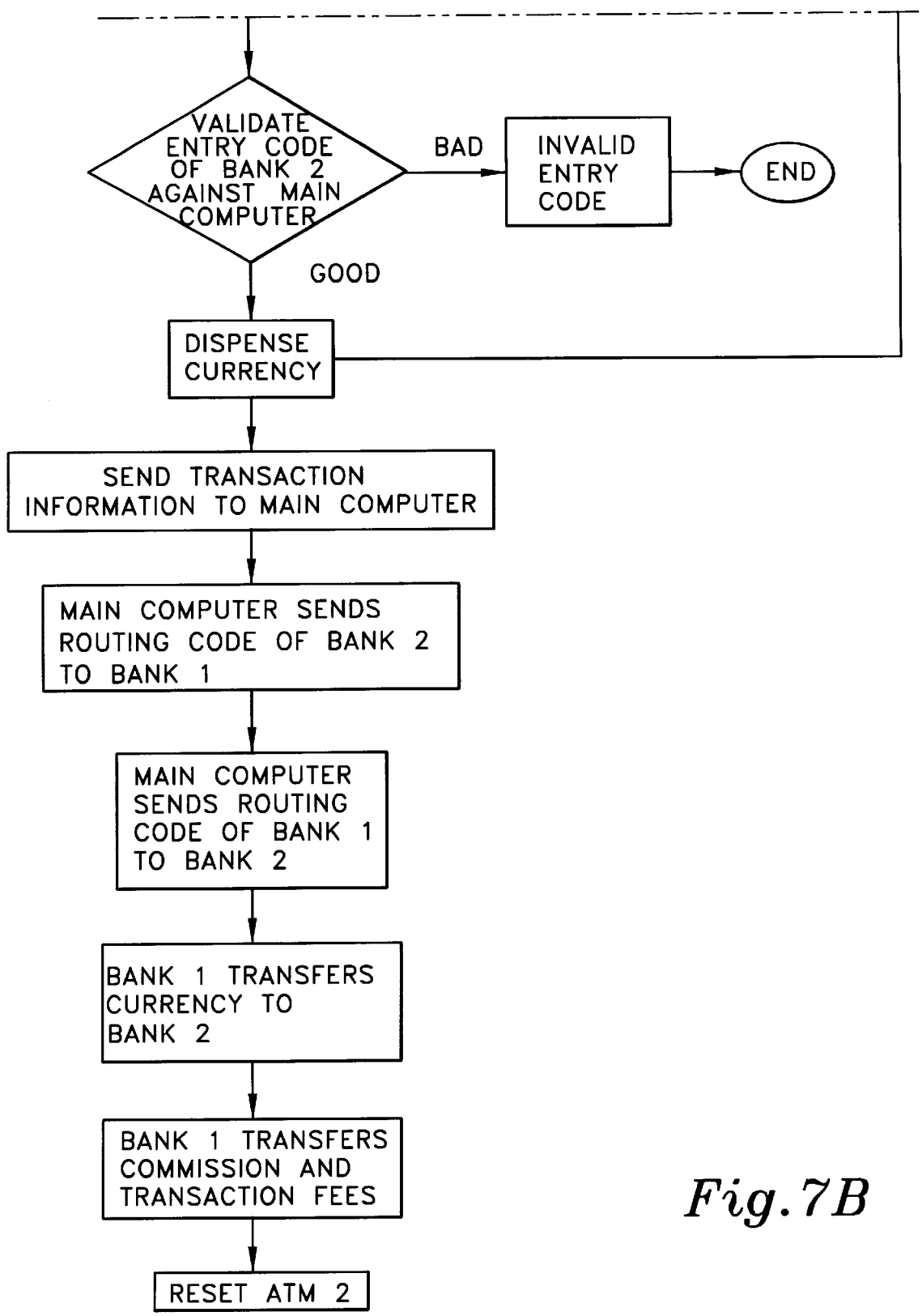
FIG. 7B is a partial flowchart illustrating the procedure to retrieve currency.

FIGS. 7A and 7B outline the procedure necessary to retrieve the currency which has been transferred. While many of the steps in this procedure are similar to those followed to perform the transfer part of the transaction, there is one key difference in retrieving the currency. It must be retrieved from an ATM. A second ATM is located and the recipient's transaction card, or second transaction card, is inserted into the card reader thereof in order to begin the session. The second ATM is in remote communication with a second computer system containing a database with information on accounts held therein. If necessary, the recipient may need to verify their authority to access the second account by providing the appropriate PIN associated with the account. Once the PIN is verified, access to the account may be granted.

As with the individual transferring the money, the recipient may elect to perform routine banking functions or receive the currency recently transferred to the second account. If the recipient does not wish to receive the currency at this time, they are prompted to perform other transactions. If no transactions are desired, the session is terminated. On the other hand, if receipt of the currency is desired, the second computer system transmits the account number to the main computer for validation. The maini computer queries its database in order to determine if the account number received matches the account number transmitted by the first bank. If the account numbers match, the main computer transmits a signal back to the second computer system indicating whether the transaction is allowed to proceed or whether it should be cancelled. The recipient may now instruct the second ATM to dispense the amount of currency which was transferred. Based on the particular bank or ATM network being used to receive the currency, there may be certain restrictions on the amount of currency which can be dispensed. The recipient may perform subsequent transactions or the session may be terminated and the second transaction card removed.

The actual transaction, again, is still incomplete and various additional steps must be taken by the ATM and the second computer system. The second computer system must provide the main computer with transaction information such as the routing code and the second account number of the second bank to which it belongs. The main computer transmits the information regarding the transaction, which was provided by the first computer system, to the second computer system. The main computer also transmits transaction information from the second computer system over to the first computer system. As previously noted, this information should include the number of the first account, the amount of currency transferred, and the routing code of the first bank. Thus, the ATM network can use the routing code to identify the financial institution to which the first bank belongs as well as the specific branch and vice versa. The account number is used to identify the specific account at the bank from which the currency must be debited. The first bank must now transmit information to the main computer to verify the transaction and confirm the transfer of funds to the ATM network. The first bank must also allocate commissions and transaction fees from the first account. These fees would be transferred to various entities involved in the transaction. For example, the first bank, the ATM network, the institution to which the main computer belongs, etc. At this point, the transaction is completed and the ATM is reset so that another transaction card may be inserted to begin a new session.

It should be noted, however, that first and second ATM's may be reset at different points in the transfer and retrieval processes. For example, once a transaction card is removed from a card reader, the respective ATM may be reset. Subsequent steps may be performed by the first and second computer systems as background tasks in order provide immediate access to the first and second ATM's. Furthermore, the first and second computer systems may simply store this information for later processing since most of such transactions are performed in batch during the night hours.

In a recipient does not possess a current transaction card, the system may create and issue one upon presentation of proper identification. Such a transaction card would be limited to the receipt of transferred currency from an ATM. Thus, such a recipient would be unable to perform banking transactions. It is also possible to link wire transferring systems to the current currency transfer system. This would allow individual who do not possess current transaction cards an alternative option for receiving currency.

It is to be understood that the present invention is not limited to the embodiments described above, but encompasses any and all embodiments within the scope of the following claims.

I claim:

1. A method of transferring currency from a first account to an ATM comprising the steps:

a. accessing a first account at a first financial institution;
  b. selecting a predetermined amount of currency for transfer from said first account;
  c. inputting validation information pertaining to a second account of an intended recipient of said predetermined amount currency;
  d. transmitting data to a database in a main computer indicative of a financial transaction corresponding to the transfer of said predetermined amount of currency from said first account to said intended recipient along with validation information pertaining to a second account of said intended recipient;
  e. storing data of said first account, said intended recipient, and said validation information pertaining to said second account of said intended recipient on said main computer;
  f. accessing a second ATM of a second financial institution;
  g. inputting into said second ATM said validation information pertaining to said second account of said intended recipient and said predetermined amount of currency to be transferred to said recipient;
  h. verifying said validation information pertaining to said second account of said intended recipient and said predetermined amount of currency to be transferred to said recipient with the main computer;
  i. retrieving the predetermined amount of currency from the second ATM; and
  j. transferring the predetermined amount of currency from the first account to the second financial institution.

2. A method of transferring currency as recited in claim 1, wherein said step of inputting validation information pertaining to a second account comprises inputting information selected from the group consisting of an account number corresponding to said second account or a transaction card number corresponding to said second account.

3. A method of transferring currency as recited in claim 1 wherein said step of accessing a first account comprises the steps of:

a. establishing a remote connection to a computer system of a first financial institution using a general purpose computer;

b. entering information pertaining to the first account, wherein said information is selected from the group an account number corresponding to said first account or a transaction card number corresponding to said second account; and c. entering a PIN associated with the first account.

4. A method of transferring currency as recited in claim 3 wherein said step of accessing a first account further comprises the steps:

d. inserting a first transaction card into a card reader of a first ATM; and e. entering a PIN associated with the first account.

5. A method of transferring currency as recited in claim 4 wherein said step of transmitting data further comprises the steps:

a. sending the validation information pertaining to a second account of an intended recipient to the main computer; and b. reserving the predetermined amount of currency on the first account.

6. A method of transferring currency as recited in claim 5 wherein:

a. said step of selecting a predetermined amount of currency further comprises the step of verifying that the predetermined amount of currency does not exceed a current balance in the first account; and b. said step of inputting the validation information pertaining to the second account of the recipient further comprises the step of validating either the account number corresponding to the second account or validating the transaction card number corresponding to the second account to ensure that the second account is maintained in or issued by a financial institution possessing a valid entry code in the database of the main computer.

7. A method of transferring currency as recited in claim 6 wherein said step of transferring the predetermined amount of currency from the first account to the second financial institution further comprises the steps:

a. retrieving information from the main computer indicative of the amount of currency to be transferred;

b. transmitting, via the main computer, the appropriate information needed to identify the second financial institution to which the second ATM belongs, to the first financial institution containing the first account; and c. transmitting, via computer, appropriate information needed to identify the first financial institution containing the first account, to the second financial institution containing the second ATM.

8. A method of transferring currency as recited in claim 7 wherein said first financial institution and second financial institution are branches of different financial institutions selected from the group consisting of banks or credit card companies.

9. A system for transferring currency between ATMs comprising:

a. a first account held in a first financial institution;

b. a first ATM network comprising a first ATM connected to a main computer;

c. means associated with said first ATM for accessing said first account;

d. a second account;

e. a second ATM network comprising a second ATM and connected to the main computer;

f. means associated with said first ATM for transferring currency from said first account to said second ATM;

g. transmission means for communicating information between said first account and said second ATM; and h. means associated with said second ATM for retrieving currency transferred from said first account.

10. A system for transferring currency between ATMs as recited in claim 9 further comprising:

a. a first financial institution for holding said first account, said first financial institution including a first computer system including a CPU, data storage and retrieval means, and a database for storing information pertaining to various accounts held in said first financial institution; and b. a second financial institution for holding said second account, said second financial institution including a second computer system including a CPU, data storage and retrieval means, and a database for storing information pertaining to various accounts held in said second financial institution.

11. A system for transferring currency between ATMs as recited in claim 10 wherein said first and second computer systems are associated with said first ATM network and second ATM network, respectively.

12. A system for transferring currency between ATMs as recited in claim 11 wherein said means for accessing said first account comprises:

a. a first transaction card containing information pertaining to said first account encoded thereon; and b. verification means for requesting a PIN associated with said first transaction card and comparing said PIN with information stored in said first computer system.

13. A system for transferring currency between ATMs as recited in claim 12 wherein said means for transferring currency comprises:

a. a plurality of selection menus displayed on said first ATM for inputting information pertaining to said second account;

b. means for checking the validity of said second account;

c. means for verifying that the amount of currency desired for transfer does not exceed the current balance in said first account; and d. means for sending information to said first computer system indicative of debiting said first account by said amount of currency.

14. A system for transferring currency between ATMs as recited in claim 13 wherein said transmission means comprises:

a. a first modem operatively coupled to said first computer system;

b. a second modem operatively coupled to said second computer system;

c. a main computer including a third modem connected thereto; and d. said first and second modems being capable of establishing a connection with said main computer in order to transfer information pertaining to said first and second accounts.

15. A system for transferring currency between ATMs as recited in claim 14 wherein said means for retrieving currency comprises:

a. a second transaction card containing information pertaining to said second account encoded thereon; and b. verification means for requesting a PIN associated with said second transaction card and comparing said PIN with information stored in said second computer system.

16. A system for transferring currency between ATMs as recited in claim 15 wherein said first financial institution and second financial institution are branches of different financial institutions selected from the group consisting of banks or credit card companies.

17. A system for transferring currency between ATMs as recited in claim 14 wherein said first account and said second account are credit card accounts.

* * * * *